Feb. 9, 1965    W. B. MOREHEAD    3,168,783
CENTER GAUGE
Filed March 12, 1964    2 Sheets-Sheet 1
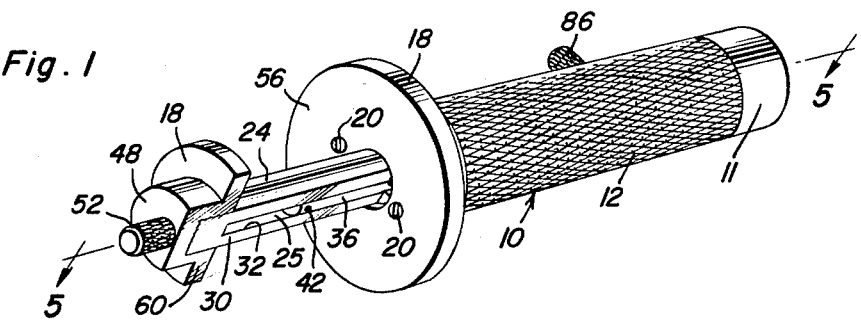
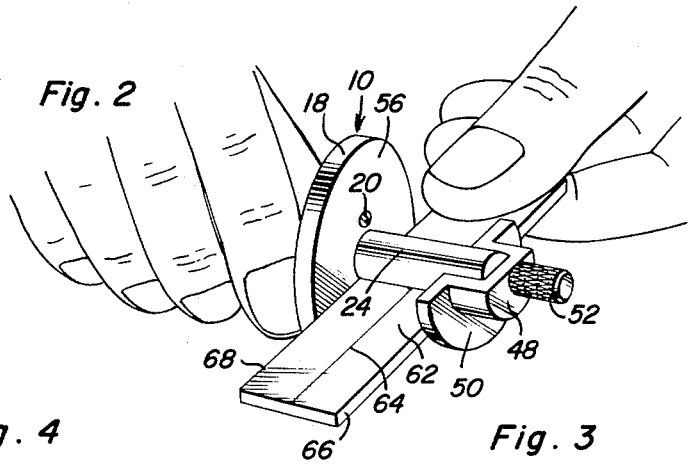
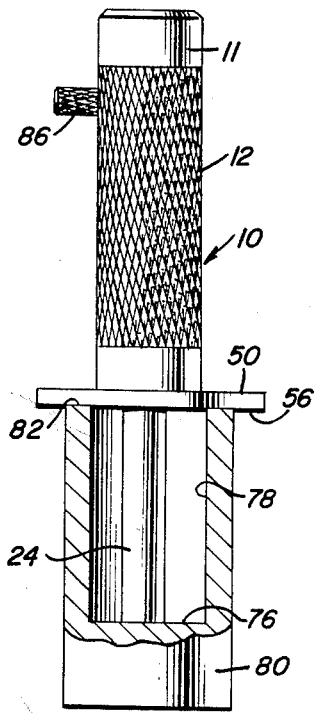
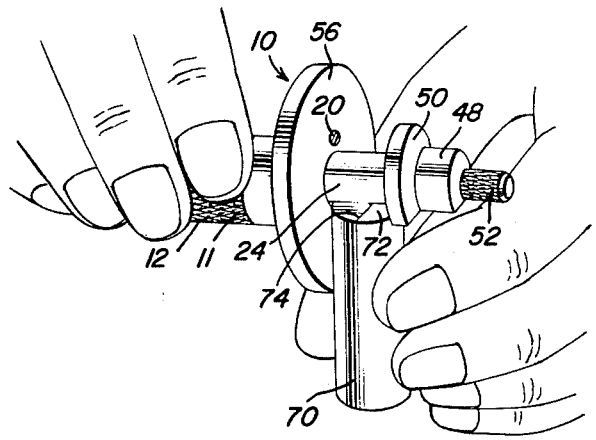
William B. Morehead
INVENTOR.

Feb. 9, 1965 W. B. MOREHEAD 3,168,783
CENTER GAUGE
Filed March 12, 1964 2 Sheets-Sheet 2
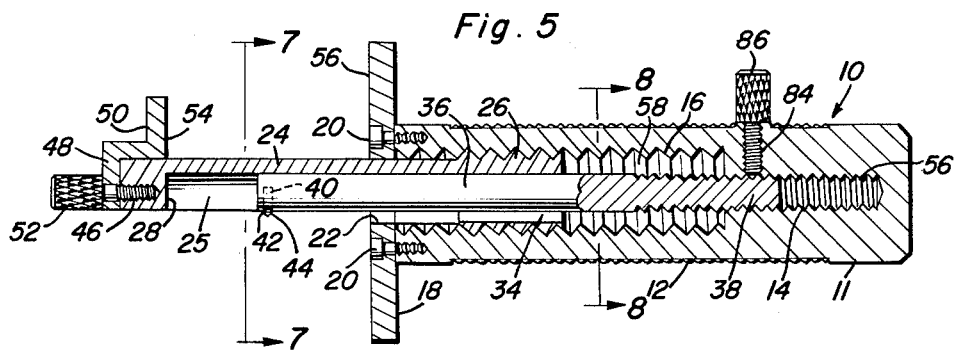
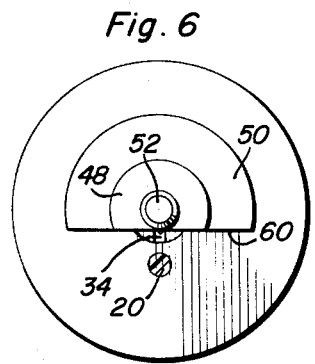
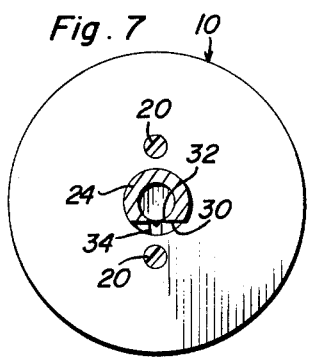
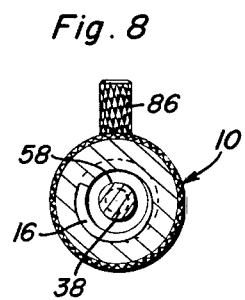
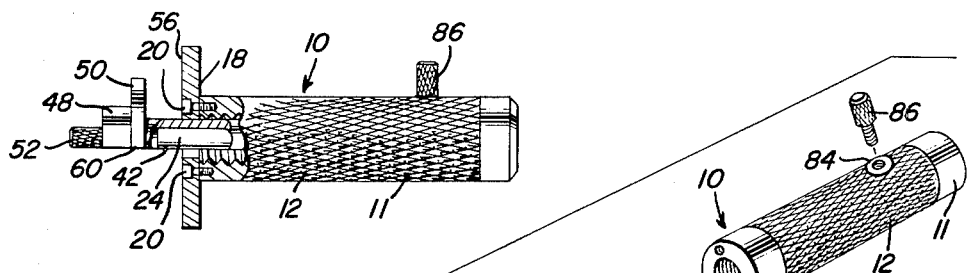
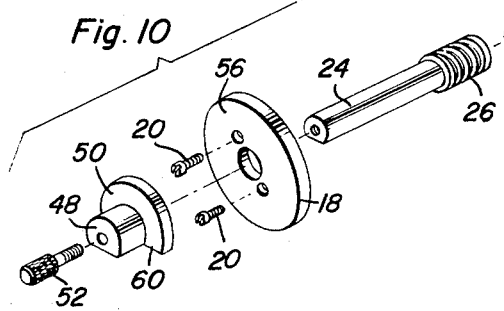
William B. Morehead
INVENTOR.

United States Patent Office 3,168,783
Patented Feb. 9, 1965

3,168,783
CENTER GAUGE
William B. Morehead, 2917 Buckley Ave.,
Lake Worth, Fla.
Filed Mar. 12, 1964, Ser. No. 351,356
7 Claims. (Cl. 33—42)

This invention relates to a novel and useful center gauge and more specifically to a gauge designed primarily to enable a workman to scribe a line down the center of a strip of wood, metal, plastic or other material in an accurate and effortless manner. In addition, the center gauge of the instant invention may also be readily utilized to accurately locate the center of either end of a cylindrical object.

The center gauge of the instant invention includes a cylindrical sleeve member in which a shank member is longitudinally reciprocable and the sleeve and shank members include threaded connections with an actuator or handle with the members having different quantities of threads per unit of length in their threaded connections with the handle or actuator. In this manner, with the shank member being prevented from rotating relative to the sleeve member, rotation of the handle or actuator relative to the sleeve and shank members effects longitudinal displacement of the shank and sleeve members relative to the handle of a ratio to each other determined by the ratio of threads per unit of length formed on the shank and sleeve members. In this manner, if one of the members has twice the number of threads per inch formed on the other member, its displacement relative to the handle will be one-half the displacement of the other member relative to the handle upon rotation of the handle relative to the shank and sleeve members.

Although the center gauge of the instant invention includes only one sleeve member, it is to be understood that a plurality of concentric sleeve members may be utilized with each having a threaded connection with the handle or actuator defined by threaded connections between the sleeve members and the handle having different numbers of threads per unit of length.

While centering gauges such as that disclosed in U.S. Patent No. 2,829,436, dated April 8, 1958, employing the use of an actuator having right and lefthanded threads thereon have been heretofore known, these types of centering gauges are obviously limited to a device capable of establishing only three reference points whereas the center gauge of the instant invention may be constructed, when provided with a plurality of the aforementioned sleeve members, so as to establish more than three reference points.

The main object of this invention is to provide a center marking gauge including means whereby the exact center of a line extending between two points may be accurately determined in an efficient manner and with very little effort.

A further object of this invention, in accordance with the immediately preceding object, is to provide a center marking gauge including means by which the relatively movable portions of the center gauge may be releasably locked in adjusted positions relative to each other.

Still another object of this invention is to provide a center marking gauge in accordance with the preceding objects which may be utilized to greatly facilitate layout work on various articles which are to be machined or have other work performed thereon requiring precise location of the tool relative to the article.

A final object of this invention to be specifically enumerated herein is to provide a center gauge constructed in accordance with the preceding objects which will conform to conventional forms of manufacture, be of simple construction and easy to use so as to provide a device that will be economically feasible, long lasting and relatively troublefree in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the center gauge of the instant invention;

FIGURE 2 is a perspective view of the center gauge in use scribing a line down the center of an elongated workpiece including parallel opposite side edges;

FIGURE 3 is a perspective view of the center gauge of the instant invention showing the gauge in use to locate the exact center of one end of a cylindrical rod;

FIGURE 4 is an enlarged fragmentary side elevational view of the center gauge showing the manner in which it may be utilized to measure to the depth of a blind bore, portions of the workpiece in which the blind bore is formed being broken away and shown in section;

FIGURE 5 is a longitudinal sectional view taken substantially upon a plane passing through the longitudinal center line of the center gauge;

FIGURE 6 is an end elevational view of the center gauge as seen from the left side of FIGURE 5;

FIGURES 7 and 8 are transverse vertical sectional views taken substantially upon the planes indicated by the section lines 7—7 and 8—8, respectively, of FIGURE 5;

FIGURE 9 is a side elevational view of the center gauge on somewhat of a reduced scale with parts of the center gauge being broken away and shown in section; and FIGURE 10 is an exploded perspective view of the center gauge.

Referring now more specifically to the drawings the numeral 10 generally designates the center gauge of the instant invention which includes an elongated handle 11 which is knurled as at 12 on its exterior and has a longitudinal threaded blind bore 14 formed therein. The bore 14 includes a counterbore 16 and the end of the handle 11 through which the counterbore 16 opens has an abutment plate 18 secured thereto in any convenient manner such as by fasteners 20. The abutment plate 18 is centrally apertured as at 22.

A sleeve member 24 including an externally threaded enlarged end portion 26 has its enlarged end portion threadedly engaged in the counterbore 16 and it may be seen that the sleeve member 24 defines a longitudinal bore 25 formed therein which opens outwardly of the enlarged end portion 26 at one end and terminates at the other end in an end wall 28.

The sleeve member 24 is cut along a plane disposed on a cord of the bore 26 throughout the length of the diametrically reduced portion therof so as to form a flat work-engaging surface 30 and a slot 32 extending from the end wall 28 to the enlarged end portion 26. In addition, it may be seen that the portion of the bore 25 formed in the enlarged end portion 26 has a longitudinal keyway 34 formed therein which is in alignment with the slot 32.

An elongated shank member 36 is reciprocal in the bore 25 and includes an externally threaded end portion 38 which is threadedly engaged in the bore 14. The shank member 36 has a blind transverse bore 40 formed in the end thereof remote from the externally threaded end portion and an indexing projection or marking tool 42 is secured in the bore 40 in any convenient manner and projects laterally outwardly of the shank member 36 and through the slot 32. The projection or indexing member includes a point 44 on its outer end portion and locks the shank member 36 against rotation relative to the sleeve member 24.

The end of the sleeve member 24 remote from the enlarged end portion 26 thereof has a longitudinal blind bore 46 formed therein and an abutment defining a fitting 48 including an abutment flange 50 is secured to the extended end of the shank member 24 by means of a suitable threaded fastener 52 threadedly engaged in the bore 46 with the abutment flange defining an abutment surface 54 opposing the outer face 56 of the abutment plate 18.

The bore 14 includes a predetermined number of threads 56 per unit of length of the bore 14 while the counterbore 16 includes a predetermined number of threads 58 per unit of length of the counterbore 16 equal to one-half the number of threads formed in the bore 14 per unit length thereof. In this manner, upon rotation of the handle 11 relative to the sleeve and shank members 24 and 36, the sleeve and shank members 24 and 26 will be longitudinally displaced relative to the handle 11 with the displacement of the sleeve member 24 relative to the handle 11 being twice the displacement of the shank member 36 relative to the handle 11. In this manner, with the point 44 disposed equidistant from the planes containing the abutment surface 54 and the outer face 56, the exact center of an article disposed between the abutment surface 54 and the outer face 56 may be determined by the position of the point 44 of the indexing member 42.

From FIGURE 6 of the drawings it may be seen that the abutment flange 50 is generally semicircular in plan and that its straight edge 60 may be positioned so as to lie in the same plane as the work-engaging surface 30.

With attention now directed more specifically to FIGURE 2 of the drawings it may be seen that the exact center of a strip-like workpiece 62 may be scribed as at 64 by engaging the opposite side edges 66 and 68 with the abutment surface 54 and outer face 56. Then, the gauge 10 may be moved longitudinally of the workpiece 62 to scribe the exact centerline thereof. Further, if it is desired to locate the exact center of one end of a cylindrical object such as that illustrated in FIGURE 3 of the drawings, the opposite sides of the cylindrical element 70 may be engaged by the abutment surface 54 and the outer face 56 and then the tool 10 may be moved across the end face 72 of the cylindrical element 70 so as to scribe the end face 72 as at 74 by means of the point 44. After the first diametric line has been scribed across the end face 72, the cylindrical element 70 may be rotated 90 degrees about its longitudinal axis and the scribing operation may be repeated to scribe a line disposed at right angles to the line 74, the inter-section of the second line and the line 74 defining the exact center of the end face 72.

With attention now invited to FIGURE 4 of the drawings, it may be seen that the fitting 48 may be removed and that the handle 10 may be rotated so as to extend the outer end of the sleeve member 24 to the inner end wall 76 of the blind bore 78 formed in a workpiece 80. After the shank member 24 has been extended so that its outer end engages the end wall 76 when the outer face 56 is engaged with the surface 82 of the workpiece 80 through whcih the blind 78 opens, the tool 10 may be withdrawn and the extended end portion of the shank member 24 may be measured in length so as to determine the depth of the blind bore 78. Further, it may be seen from FIGURE 5 of the drawings that the handle 11 has a threaded transverse bore 84 formed therein in which a setscrew 86 is threadedly engaged. The inner end of the bore 84 opens into the bore 14 and is engageable with the threaded end portion 38 of the shank member 36. Inasmuch as the shank member 36 is locked against rotation relative to the sleeve member 24, the engagement of the inner end of the setscrew 86 with the end portion 38 will prevent the handle 11 from being rotated relative to both the sleeve and shank members 24 and 36.

Although the indexing member 42 has been illustrated and described as being pointed so as to be capable of scribing a metallic workpiece, it is to be noted that the indexing member 42 may be readily replaced by any suitable marking member. Additionally, it will be noted that the aperture in the center of the abutment plate 18 has a diameter less than the major diameter of the threaded counterbore 16. Accordingly, it may be seen that the plate 18 prevents the sleeve member 24 from being fully withdrawn from within the handle 11 and therefore also prevents the shank member 36 from being withdrawn from the handle 11. However, as soon as the plate 18 is removed, the handle 11 may be screwed off the externally threaded enlarged end portion 26 of the sleeve member 24, clearance for the indexing member 42 being provided by the keyway 34.

In addition to being capable of being used for the purposes thereinbefore set forth, the center gauge 10 may also be used as a cutting tool with the pointed end of the marking tool 42 being used as a cutter. Further, this center gauge 10 may also be utilized in a similar manner to locate and scribe fold lines and as an aid in setting type used in columnar paper work.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A center gauge comprising elongated handle means, a longitudinal threaded bore formed in said handle means having one end thereof opening outwardly of said handle means, said handle means defining a threaded counterbore in said one end of said bore, a sleeve member externally threaded on one end portion and threadedly engaged in said counterbore with the other end portion of said sleeve member projecting outwardly of said one end of said handle means, a shank member slidably disposed in said sleeve member and externally threaded on one end portion and threadedly engaged in said bore with its other end portion projecting outwardly of said one end of said handle means, coacting means defined by said members preventing relative rotation therebetween, index means carried by said other end portion of said members, one of said members having twice the number of threads per unit of length on its threaded end portion than the other of said members.

2. The combination of claim 1 wherein said other end portion of said sleeve member projects outwardly of said handle means beyond said other end portion of said shank member, said sleeve member having a longitudinal radially outwardly opening slot formed in said other end portion thereof, said other end portion of said shank member including a lateral projection slidably received in said slot, said slot and projection comprising said coacting means.

3. The combination of claim 2 wherein said projection also comprises the index means carried by said shank member.

4. The combination of claim 3 wherein the outermost end of said projection comprises a marking point.

5. The combination of claim 4 wherein said one end of said handle means defines first abutment means, said sleeve member, outwardly of said other end of said shank member including means defining second abutment means projecting laterally outwardly of said sleeve member, said marking point being disposed between said first and second abutment means.

6. The combination of claim 5 wherein said marking point is disposed equidistant from said first and second abutment means.

7. A center gauge comprising elongated handle means, a longitudinal threaded bore formed in said handle means having one end thereof opening outwardly of said handle means, said handle means defining a threaded counterbore in said one end of said bore, a sleeve member externally threaded on one end portion and threadedly engaged in said counterbore with the other end portion of said sleeve member projecting outwardly of said one end of said handle means, a shank member slidably disposed in said sleeve member and externally threaded on one end portion and threadedly engaged in said bore with its other end portion projecting outwardly of said one end of said handle means, coacting means defined by said members preventing relative rotation therebetween, index means carried by said other end portion of said members, the threaded end portions of said members having different quantities of threads per unit of length, said different quantities being of a predetermined ratio.

References Cited in the file of this patent

UNITED STATES PATENTS

| | | |
|---|---|---|
| 651,328 | Guilmette | June 5, 1900 |
| 956,116 | Lohman | Apr. 26, 1910 |
| 2,335,513 | Hewitt | Nov. 30, 1943 |
| 2,520,022 | Vobeda | Aug. 22, 1950 |
| 2,660,802 | Keys | Dec. 1, 1953 |
| 2,829,436 | Leinwebber | Apr. 8, 1958 |
| 2,958,133 | Seitz | Nov. 1, 1960 |